(12) United States Patent
Higashikata et al.

(10) Patent No.: US 7,830,567 B2
(45) Date of Patent: Nov. 9, 2010

(54) COLOR CONVERSION DEVICE, COLOR CONVERSION METHOD AND COLOR CONVERSION PROGRAM

(75) Inventors: Ryosuku Higashikata, Ashigarakami-gun (JP); Akihiro Ito, Ebina (JP); Yasunari Kishimoto, Ashigarakami-gun (JP); Tomoko Taguchi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 885 days.

(21) Appl. No.: 11/645,036

(22) Filed: Dec. 26, 2006

(65) Prior Publication Data
US 2007/0279714 A1  Dec. 6, 2007

(30) Foreign Application Priority Data
Jun. 5, 2006  (JP)  ............................. 2006-156109

(51) Int. Cl.
*G03F 3/08* (2006.01)

(52) U.S. Cl. .................. 358/518; 358/1.9; 358/520; 358/532; 382/167; 345/590

(58) Field of Classification Search .................. 358/1.9, 358/520, 518, 530, 532, 538; 382/162, 166, 382/167; 345/590
See application file for complete search history.

(56) References Cited

U.S. PATENT DOCUMENTS

| | | | | |
|---|---|---|---|---|
| 5,060,060 A * | 10/1991 | Udagawa et al. | ............. | 358/520 |
| 5,181,105 A * | 1/1993 | Udagawa et al. | ............. | 358/520 |
| 6,868,179 B2 * | 3/2005 | Gruzdev et al. | ............. | 382/167 |
| 6,995,865 B1 * | 2/2006 | Motomura | ............. | 358/1.9 |
| 7,251,361 B2 * | 7/2007 | Gruzdev et al. | ............. | 382/167 |
| 2003/0012433 A1 * | 1/2003 | Gruzdev et al. | ............. | 382/167 |
| 2005/0105147 A1 * | 5/2005 | Gruzdev et al. | ............. | 358/518 |
| 2005/0264837 A1 * | 12/2005 | Shimada | ............. | 358/1.9 |
| 2005/0280848 A1 * | 12/2005 | Seko | ............. | 358/1.9 |
| 2006/0221396 A1 * | 10/2006 | Sloan | ............. | 358/1.9 |
| 2006/0232803 A1 * | 10/2006 | Hori et al. | ............. | 358/1.9 |
| 2006/0244686 A1 * | 11/2006 | Higgins et al. | ............. | 345/590 |
| 2006/0274340 A1 * | 12/2006 | Yamazoe | ............. | 358/1.9 |

(Continued)

FOREIGN PATENT DOCUMENTS

JP  A 2000-184221  6/2000

(Continued)

OTHER PUBLICATIONS

Aug. 17, 2010 Office Action issued in Japanese Patent Application No. 2006-156109 (with translation).

*Primary Examiner*—Kimberly A Williams
(74) *Attorney, Agent, or Firm*—Oliff & Berridge, PLC

(57) ABSTRACT

A color conversion device for color-converting an input image signal in an input color reproduction region of a source device, in a predetermined color space, by mapping the input image signal into an output color reproduction region of a destination device in the predetermined color space, comprising: a calculation portion for calculating a mapping destination in the output color reproduction region of a pre-specified characteristic point in the input color reproduction region; a correction portion for correcting the output color reproduction region such that a region including a saturation higher than the calculated mapping destination is eliminated; and a mapping portion for mapping the input image signal into the corrected output color reproduction region, is provided.

16 Claims, 10 Drawing Sheets

U.S. PATENT DOCUMENTS

| | | | |
|---|---|---|---|
| 2007/0030498 A1* | 2/2007 | Hori et al. | 358/1.9 |
| 2007/0035754 A1* | 2/2007 | Hori et al. | 358/1.9 |
| 2007/0236761 A1* | 10/2007 | Sloan | 358/1.9 |
| 2009/0122073 A1* | 5/2009 | Higgins et al. | 345/590 |
| 2010/0020242 A1* | 1/2010 | Lammers et al. | 348/642 |

FOREIGN PATENT DOCUMENTS

| | | |
|---|---|---|
| JP | A-2000-253269 | 9/2000 |
| JP | 2004032140 A * | 1/2004 |
| JP | A 2005-184601 | 7/2005 |
| JP | A 2005-184602 | 7/2005 |
| JP | 2006340105 A * | 12/2006 |
| JP | 2007060420 A * | 3/2007 |

* cited by examiner

COLOR CONVERSION DEVICE, COLOR CONVERSION METHOD AND COLOR CONVERSION PROGRAM

BACKGROUND

1. Technical Field

The present invention relates to a color conversion device, a color conversion method and a color conversion program, and more specifically relates to a color conversion device, color conversion method and color conversion program for carrying out color conversion processing on color image signals, particularly in a case in which color reproducible regions of color image signals differ between a source device and a destination device.

2. Related Art

Devices which output color images include, for example, display devices such as CRTs, color LCDs and the like and printing devices such as printers and the like. Among these output devices, because respective output techniques and the like differ, the reproducible color ranges differ. In a CRT, because the output technique is a technique of causing a fluorescent material to illuminate, vivid colors can be displayed in regions of high brightness. In contrast, because the technique of a printer is displaying colors by superposing colorants, it is difficult to display colors with high brightness and high color saturation other than primary colors, but reproduction of colors with high saturations is possible for regions with lower brightnesses than with a CRT.

Thus, because the color reproducible region differs in accordance with an output device, in a case of, for example, printing an image prepared on a CRT at a printer, it may not be possible to reproduce colors displayed by the CRT at the printer. For example, colors with high brightness and high saturation can be outputted on a CRT but may not be reproducible with a printer. On the other hand, low-brightness, high-saturation colors can be reproduced by a printer but may not be capable of display at a CRT. Therefore, at least colors which cannot be reproduced are converted to colors which are considered closest thereto for output, such that it is possible to reproduce the whole of an image at an output device with the best possible quality. In such a case, color gamut mapping (gamut mapping) is necessary for converting supplied color image signals to colors within the color reproducible region of the output device.

SUMMARY

According to an aspect of the present invention, there is provided: a color conversion device for color-converting an input image signal in an input color reproduction region of a source device, in a predetermined color space, by mapping the input image signal into an output color reproduction region of a destination device in the predetermined color space, comprising: a calculation portion for calculating a mapping destination in the output color reproduction region of a pre-specified characteristic point in the input color reproduction region; a correction portion for correcting the output color reproduction region such that a region including a saturation higher than the calculated mapping destination is eliminated; and a mapping portion for mapping the input image signal into the corrected output color reproduction region.

BRIEF DESCRIPTION OF THE DRAWINGS

An exemplary embodiment of the present invention will be described in detail based on the following figures, wherein.

DETAILED DESCRIPTION

Herebelow, an example of the exemplary embodiment of the present invention will be described in detail with reference to the drawings.

Figure 1:
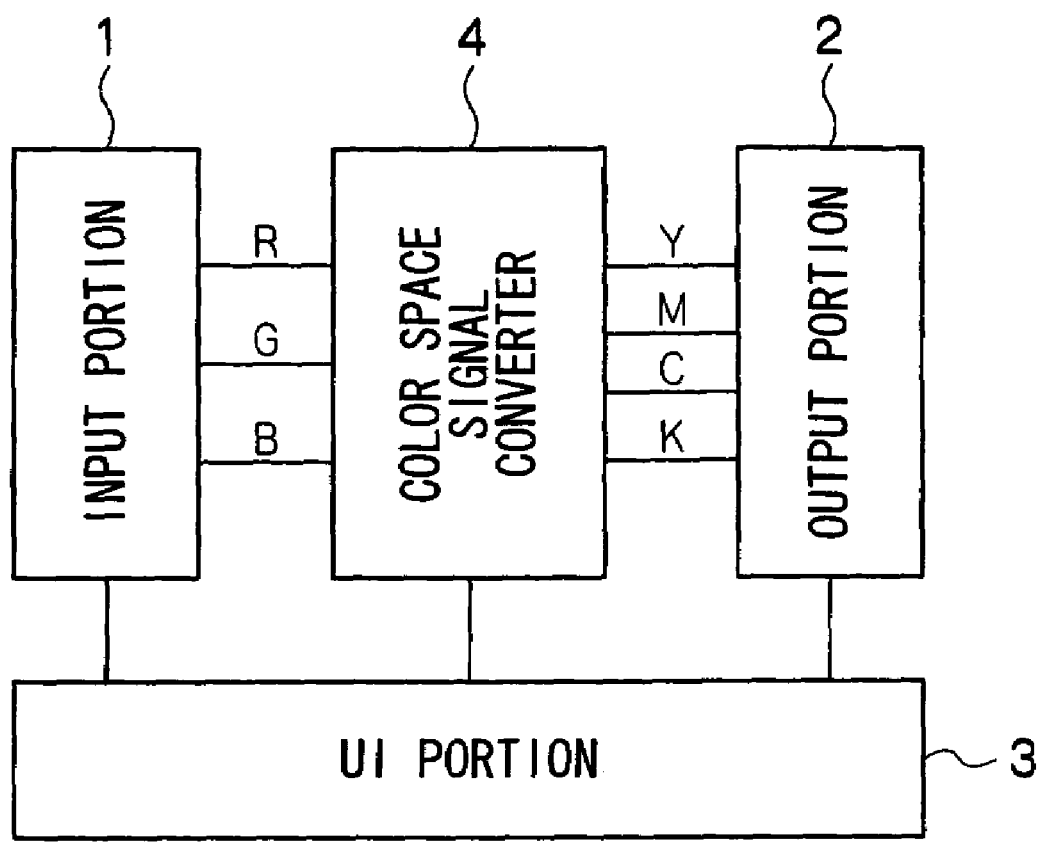
FIG. 1 is a block diagram showing an example of schematic structure of a color conversion device relating to the present invention.

First of all, schematic structure of a color conversion device will be described. FIG. 1 is a block diagram showing an example of schematic structure of a color conversion device relating to the present invention. The color conversion device which will be described herein is employed having been mounted at an image output device, which is a digital photocopier, a printer or the like, or mounted at a server device connected to such an image output device, or mounted at a computer which provides operational commands to such an image output device (i.e., a driver device). As shown in FIG. 1, the color conversion device is provided with an input portion 1, an output portion 2, a user interface (hereafter shortened to 'UI') portion 3 and a color space signal converter 4.

The input portion 1 is for acquiring input image signals from a source device. The input image signals may be, for example, color image signals in an RGB color space for being displayed at a CRT or the like. For the present exemplary embodiment, a case in which the input image signals are color image signals in the RGB color space will be described.

The output portion 2 is for outputting output image signals to a destination device. The output image signals may be, for example, color image signals in a YMC color space or YMCK color space for being printed at a printer or the like. For the present exemplary embodiment, a case in which the output image signals are color image signals in the YMCK color space will be described.

The UI portion 3 is for applying various settings to the color space signal converter 4 in accordance with operations by a user.

The color space signal converter 4 is for converting the input image signals acquired by the input portion 1 to the output image signals to be outputted by the output portion 2. The color space signal converter 4 converts the input image signals to the output image signals by applying mapping processing to the input image signals. The color space signal converter 4 also performs color gamut mapping, after correcting an outer border of a color reproduction region of the destination device such that magnitude relations of saturations will not be inverted in the color gamut mapping.

Figure 2:
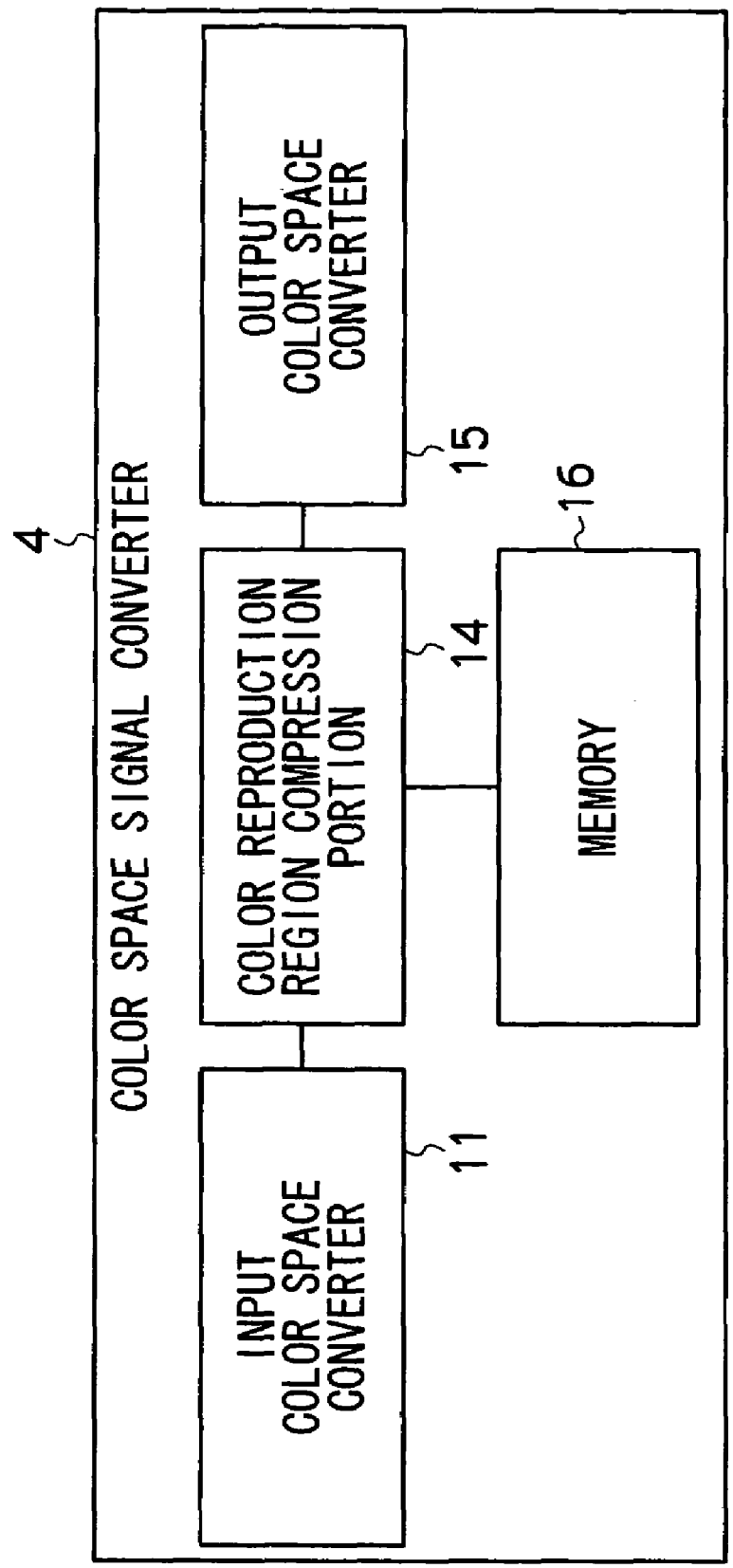
FIG. 2 is a block diagram showing an example of schematic structure of a color space signal converter of the color conversion device.

Now, this color space signal converter 4 will be described in more detail. FIG. 2 is a block diagram showing an example of schematic structure of the color space signal converter. As is shown in FIG. 2, the color space signal converter 4 is provided with an input color space converter 11, a color reproduction region compression portion 14, an output color space converter 15 and a memory 16.

In a case in which the color space of the input image signals differs from a color space to be employed at a later stage, the input color space converter 11 carries out color space conversion processing into the color space employed at the later stage. For example, in a case in which the input image signals are signals in the RGB color space whereas processing by the color reproduction region compression portion 14 is to be performed in a color space which is not dependent on devices, such as, for example the CIE-L*a*b* color space, the input color space converter 11 performs a conversion from the RGB color space into the L*a*b* color space. In the present exemplary embodiment, a case in which the CIE-L*a*b* color space is employed as the device-independent color space will be described, but this is not a limitation. Another device-independent color space, such as Jch or the like, could be employed. However, it is preferable to employ a color space with which hues will not be altered when color gamut mapping is performed toward an achromatic axis.

In a case in which the input image signals will be signals in the device-independent color space, there will be no need for processing at the input color space converter 11 and, therefore, there will be no need to provide the input color space converter 11.

The color reproduction region compression portion 14 maps the input image signals outputted from the input color space converter 11 to output image signals in a range that the destination device can reproduce.

In a case in which the color space of the output image signals differs from a color space that is employed at the image output device at the output side, which will receive the output image signals, the output color space converter 15 performs color space conversion processing into the color space that is employed at the image output device. For example, if the image output device is a printer or the like, the image output device will most likely be a device which handles image signals in an YMC color space or YMCK color space. In such a case, the output color space converter 15 performs the color space conversion processing from the device-independent color space, for example, the CIE-L*a*b* color space, to the YMC color space or YMCK color space. Obviously, it may be possible for the device-independent color space signals to be outputted as is. In such a case, the processing of the output color space converter 15 will not be necessary, and therefore the image signal processing device may be structured without the output color space converter 15 being provided.

The memory 16 stores color reproduction region data representing a color reproduction region of the source device, color reproduction region data representing a color reproduction region of the destination device, a processing program to be described later, and so forth.

These portions 11 to 16 will be provided at, for example, an image output device, a server device or a driver device, and will be respectively realized by the execution of a predetermined program by a computer which is structured with a combination of a CPU (central processing unit), ROM (read-only memory), RAM (random access memory) and so forth.

Figure 4:
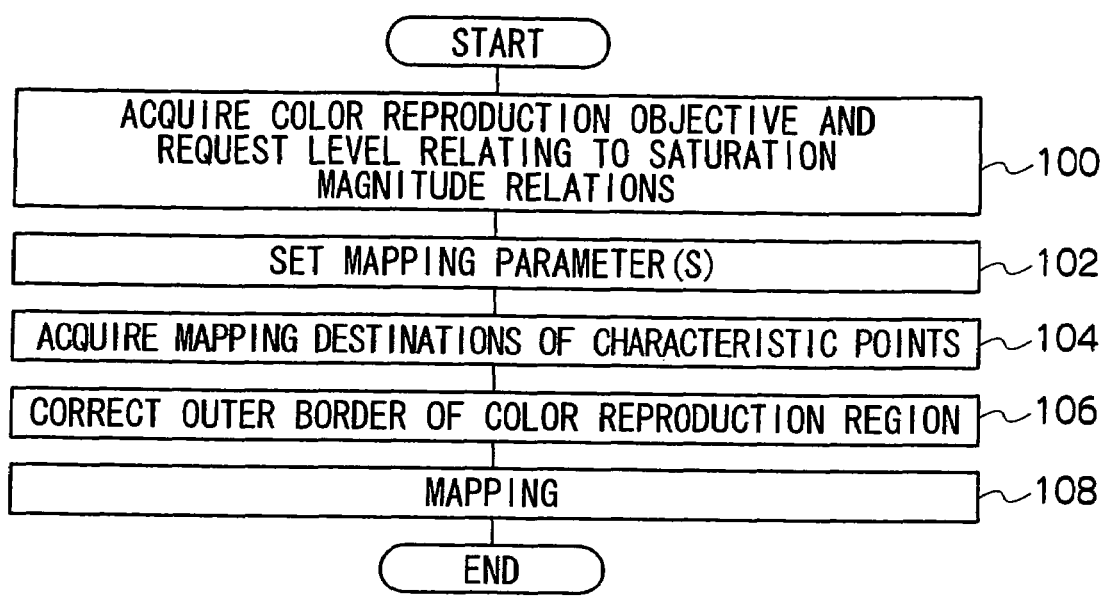
FIG. 4 is a flowchart of processing which is executed by the color space signal converter.

Next, a processing sequence when input image signals are converted to output image signals in a color conversion device structured as described above, which is to say, a color conversion method, will be described. FIG. 4 is a flowchart showing an example of a processing sequence of the image processing method relating to the present invention.

When conversion processing of a color image signal is to be performed, first, a source device color reproduction region and a destination device color reproduction region are preliminarily calculated and stored in the memory 16. At this time, a color reproduction region in a device-independent color space, for example, the CIE-L*a*b* color space, may also be calculated. In the following description, the mapping into the destination device color reproduction region is performed in the CIE-L*a*b* color space.

Figure 3:
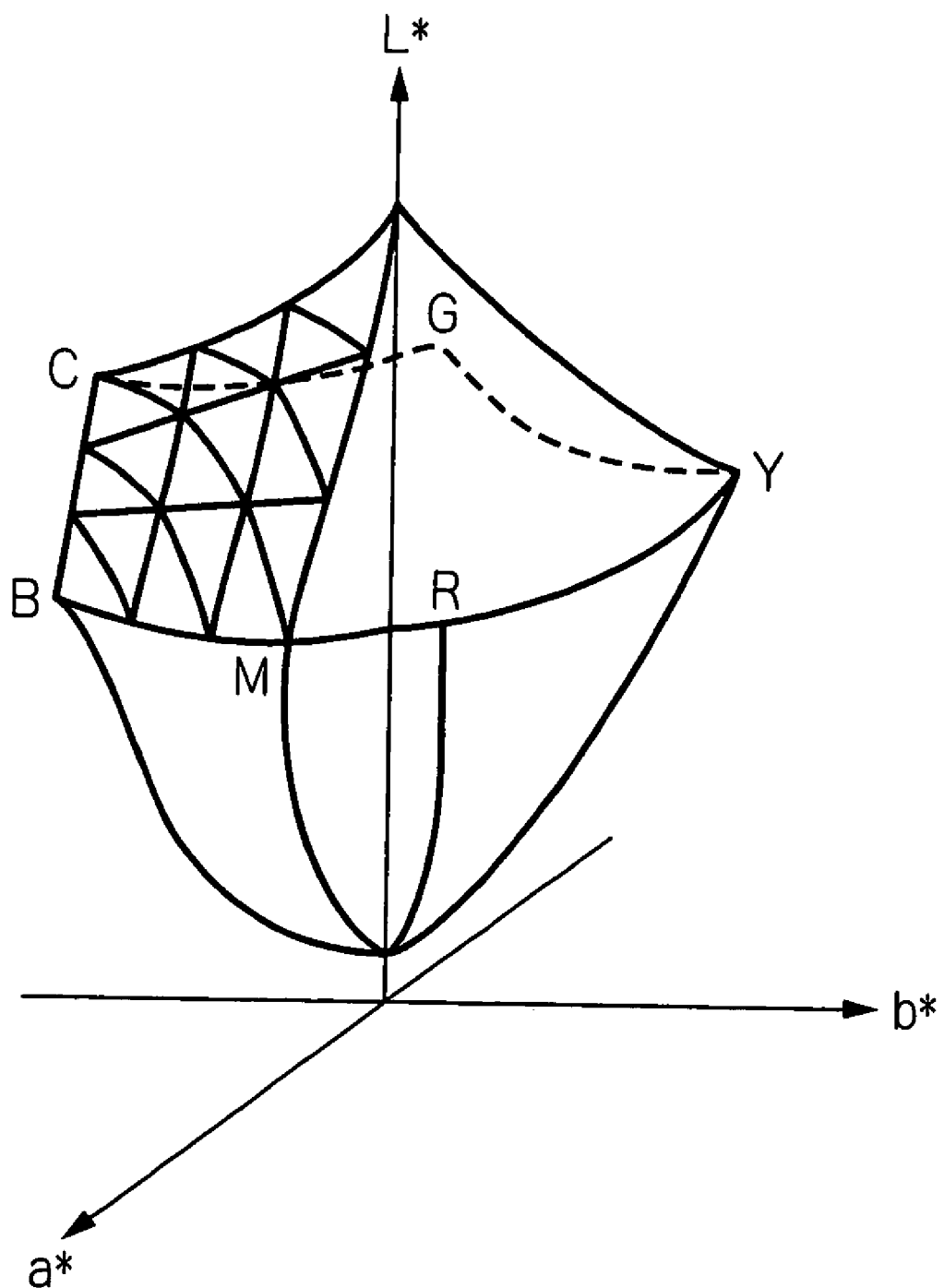
FIG. 3 is a conceptual diagram showing an example of a color reproduction region.

FIG. 3 is a conceptual diagram showing an example of a color reproduction region. In general, a color reproduction region is not regular but has a complex three-dimensional form, as shown in FIG. 3. The inside of the solid shown in FIG. 3 is a region in which color reproduction is possible, and the outside of the solid is a region in which color reproduction is not possible. Accordingly, in order to calculate the color reproduction region, information (outer border data) of a surface (an outer border surface) which represents a boundary between the region in which color reproduction is possible and the region in which color reproduction is not possible is calculated in advance. As mentioned above, the shape of this outer border surface is not regular, and the outer border surface may be expressed by being divided into polygons such as, for example, triangles or the like. In FIG. 3, only a portion of the outer border surface is shown divided into triangular shapes, but such division can be performed over the whole of the outer border surface. As a method for calculating such outer border data, it is possible to employ, for example, a method as described in Japanese Patent Application Laid-Open (JP-A) No. 2005-063093.

When, for example, the outer border surface is divided into triangles, the outer border data can be formed as an outer border surface lookup table representing correspondence relationships between brightnesses, saturations and hue angles of vertices of the triangles (below referred to as "outer border configuration points"). However, this is not a limitation.

The obtained outer border data representing outer borders of the color reproduction region of the source device and the color reproduction region of the destination device is stored in the memory 16.

Next, the processing routine that is executed at the color space signal converter 4 will be described with reference to the flowchart shown in FIG. 4. The processing shown in FIG. 4 is executed, for example, when a color conversion is instructed by operation of the UI portion 3 by a user.

First, in step 100, a settings screen for specifying a color reproduction objective, a request level relating to maintenance of magnitude relations of saturations, and the like by the user, is displayed at the UI section 3, and a color reproduction objective, a request level and the like that are specified by the user, are acquired.

For the color reproduction objective, a preferred color reproduction objective is selected from: emphasizing faithfulness of color reproduction; emphasizing gradation; emphasizing reproducibility of high saturations; and so forth. Herebelow, these color reproduction objectives are simply referred to as "faithfulness", "gradation" and "high saturation reproducibility".

The request level pertaining to maintenance of magnitude relations of saturations can be set to, for example, levels 0 to 2 as shown in the following table, but is not limited thus.

TABLE 1

| Request level | Cusp brightness hue angle direction | Ridge line hue angle direction |
| --- | --- | --- |
| Level 0 | None | None |
| Level 1 | Maintain | None |
| Level 2 | Maintain | Maintain |

In the above table, 'None' means that it is not necessary to maintain magnitude relations of saturations, and 'Maintain' means that it is necessary to maintain magnitude relations of saturations. Where 'Cusp brightness hue angle direction' has 'None', this indicates that it is not necessary to maintain magnitude relations of saturations between before and after mapping for colors in vicinities of points with maximum saturations in the L*a*b* space (below referred to simply as cusps), and where the same has 'Maintain', this indicates that it is necessary to maintain the magnitude relations of these saturations.

Where 'Ridge line hue angle directions' has 'None', this means that it is not necessary to maintain magnitude relations of saturations between before and after mapping for colors in the vicinity of a ridge line (i.e., a line representing the halftone of a predetermined color, from a white point or a black point up to the cusp of the predetermined color, that is, a line corresponding to gradations up to the predetermined color), and where the same has 'Maintain', this means that it is necessary to maintain the magnitude relations of these saturations.

As shown in table 1, with level 0, it is not necessary to maintain magnitude relations of saturations in either the cusp brightness hue angle direction or the ridge line hue angle directions, and with level 2, it is necessary to maintain magnitude relations of all saturations.

Definition of the request levels is not limited as shown in the above table 1. For example, it is possible to divide the ridge line hue angle directions into a first ridge line hue angle direction and a second ridge line hue angle direction, the first ridge line being a line linking from the white point to the cusp and the second ridge line linking from the black point to the cusp.

In step 102, a color gamut mapping method corresponding to the color reproduction objective specified by the user and parameters thereof are set, which is to say, a mapping algorithm to be employed when mapping the input image signals to the color reproduction region of the destination device to obtain output image signals, and parameters corresponding to the mapping algorithm, etc., are set. As the mapping algorithm, many previously known techniques can be employed, such as an evaluation color minimum mapping as exemplified by color difference minimum mapping, mappings in which mapping directions, degrees of compression/decompression and the like are regulated by parameters, and so forth.

In a case in which 'faithfulness' is selected as the color reproduction objective, the mapping algorithm and the parameters thereof for making the color reproduction faithful are set. As the mapping algorithm in such a case, an evaluation color minimum mapping as exemplified by color difference minimum mapping will often be employed. In a case in which 'gradation' is selected as the color reproduction objective, the mapping algorithm and the parameters thereof for making the gradation excellent, that is, for making the reproducibility of halftones excellent are set. As the mapping algorithm in such a case, an algorithm such that colors of the source device which can be reproduced at the destination device are mapped and overall gradation is made excellent will often be employed. In a case in which 'high saturation reproducibility' is selected as the color reproduction objective, the mapping algorithm and the parameters thereof for making the reproducibility of high saturation excellent are set. As the mapping algorithm in such a case, an algorithm such that mapping directions and the like are controlled and mapping destinations of colors with high saturation at the source device keep high saturations will often be employed.

For example, in a case of 'faithfulness', a color difference formula according to a degree thereof and coefficients thereof and the like can be set as parameters. In a case of 'gradation', parameters which control degrees of mapping when mapping into the color reproduction region of the destination device and the like can be set. Further, in a case of 'high saturation reproducibility', parameters which control shift amounts in the brightness direction, hue rotation amounts and the like with respect to color signals of the source device can be set.

Herein, the mapping algorithm to be employed can be set in accordance with the color reproduction objective that the user specifies, and can employ a variety of widely known techniques.

In step 104, mapping destinations of pre-specified characteristic points of the color reproduction region of the source device in, for example, the L*a*b* space are acquired. That is, color gamut mapping is applied to the characteristic points in accordance with the color gamut mapping technique (mapping algorithm) and color gamut mapping parameters set in step 102, and it is calculated where in the color reproduction region of the destination device the characteristic points will be mapped to.

The characteristic points may be, for example, cusps of pre-specified principal colors (R (red), G (green), B (blue), Y (yellow), M (magenta) and C (cyan), or the like), points on the ridge lines of the principal colors, and so forth.

Here, the calculation of mapping destinations is performed in accordance with the request level relating to maintenance of saturation magnitude relations that the user specified. For example, in the case of level 0 of the request levels in the above table 1, maintaining magnitude relations of saturations is not required in all cases. Therefore, calculating the mapping destinations is not required and the processing of the below-described step 106 is not required.

In the case of level 1, maintaining magnitude relations of saturations in the cusp brightness hue angle direction is required. Therefore, it is necessary to calculate mapping destinations with the cusps acting as the principal points. However, because maintaining magnitude relations of saturations in the ridge line hue angle directions is not required, it is not necessary to calculate mapping destinations of points on the ridge lines. Further, in the case of level 2, maintaining magnitude relations of saturations in all cases is required. Therefore, the cusps and the points on the ridge lines serve as the characteristic points and mapping destinations are calculated therefor.

In step 106, on the basis of the respective mapping destinations of the characteristic points obtained in step 104, that is, a row of characteristic points including the cusps of the principal colors and a row of characteristic points including plural points on the ridge lines of the principal colors, or the like, the outer border of the color reproduction region of the destination device is corrected.

Below, a specific method of correction of the outer border of the color reproduction region of the destination device will be described.

Figure 5B:
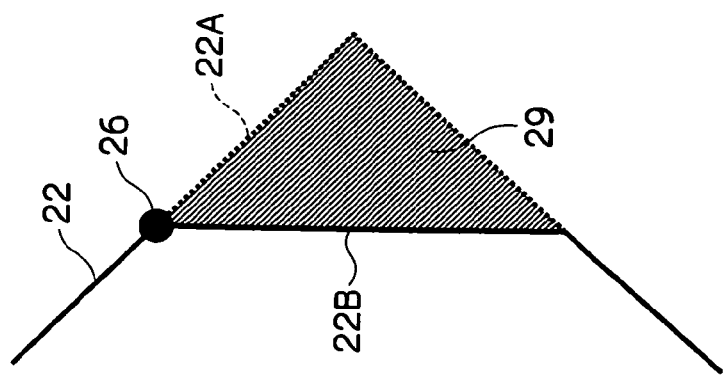
FIG. 5B is a conceptual diagram for describing correction of the outer border.
Figure 5A:
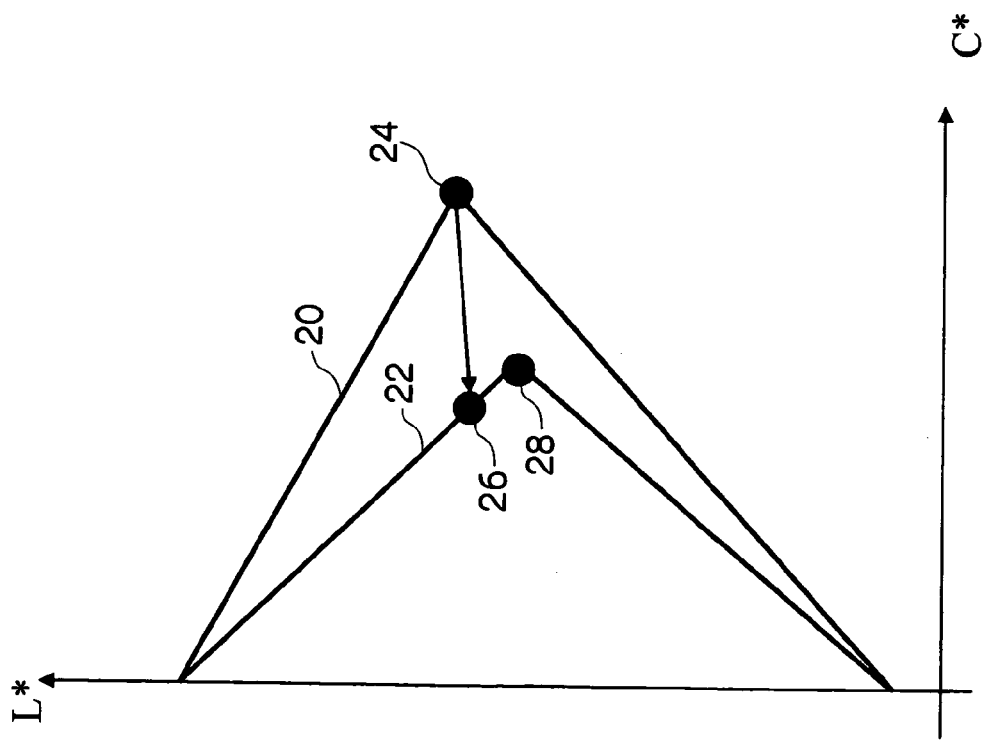
FIG. 5A is a conceptual diagram for describing correction of an outer border.

First, a case in which maintenance of saturation magnitude relations in the cusp brightness hue angle direction is required will be described. As shown in FIG. 5A, in a case in which an outer border line 20 of the color reproduction region of the source device in an L-C plane (brightness-saturation plane) of a predetermined hue is at the outer side relative to an outer border line 22 of the color reproduction region of the destination device, the mapping destination of a characteristic point (cusp) 24 on the outer border line 20 of the color reproduction region of the source device is, as shown in FIG. 5A, at a mapping point 26 on the outer border line 22 of the color reproduction region of the destination device. In this case, because the mapping point 26 has a lower saturation than a cusp 28 of the color reproduction region of the destination device, saturations according to input image signals may become inverted between before and after the mapping. Therefore, as shown in FIG. 5B, a region 29 that includes saturations higher than the mapping point 26 in the color reproduction region of the destination device (i.e., the hatched area) is eliminated from the color reproduction region of the destination device. This is carried out for each of the characteristic points. Hence, inversions of saturations in the mapping can be prevented.

A method for correcting the outer border of the color reproduction region of the destination device may be, as an example for a case in which outer border data is constituted by an outer border surface lookup table representing correspondence relationships of brightnesses, saturations and hues of the above-mentioned outer border configuration points, a method of rewriting the outer border surface lookup table. That is, the outer border surface lookup table is referred to, and the saturations of outer border configuration points with higher saturations than the saturation of the mapping point 26, which are in the region 29 of FIG. 5B, are rewritten with the saturation of the mapping point 26. This must be carried out for each hue. Calculation of regions for elimination in the hue angle direction and an elimination method will be described later. Thus, as shown in FIG. 5B, an outer border line 22A at high saturation side of the original color reproduction region of the destination device is corrected to an outer border line 22B, and the region 29 with saturations higher than the mapping point 26 is removed.

Thus, it is possible to correct the color reproduction region of the destination device with ease by rewriting the outer border surface lookup table. Here, in order to more precisely eliminate a region that is to be eliminated, appropriate outer border configuration points may be newly added so as to further divide up the triangles constituting the outer border surface. Accordingly, saturations can be effectively prevented from inverting in the mapping.

Figure 6:
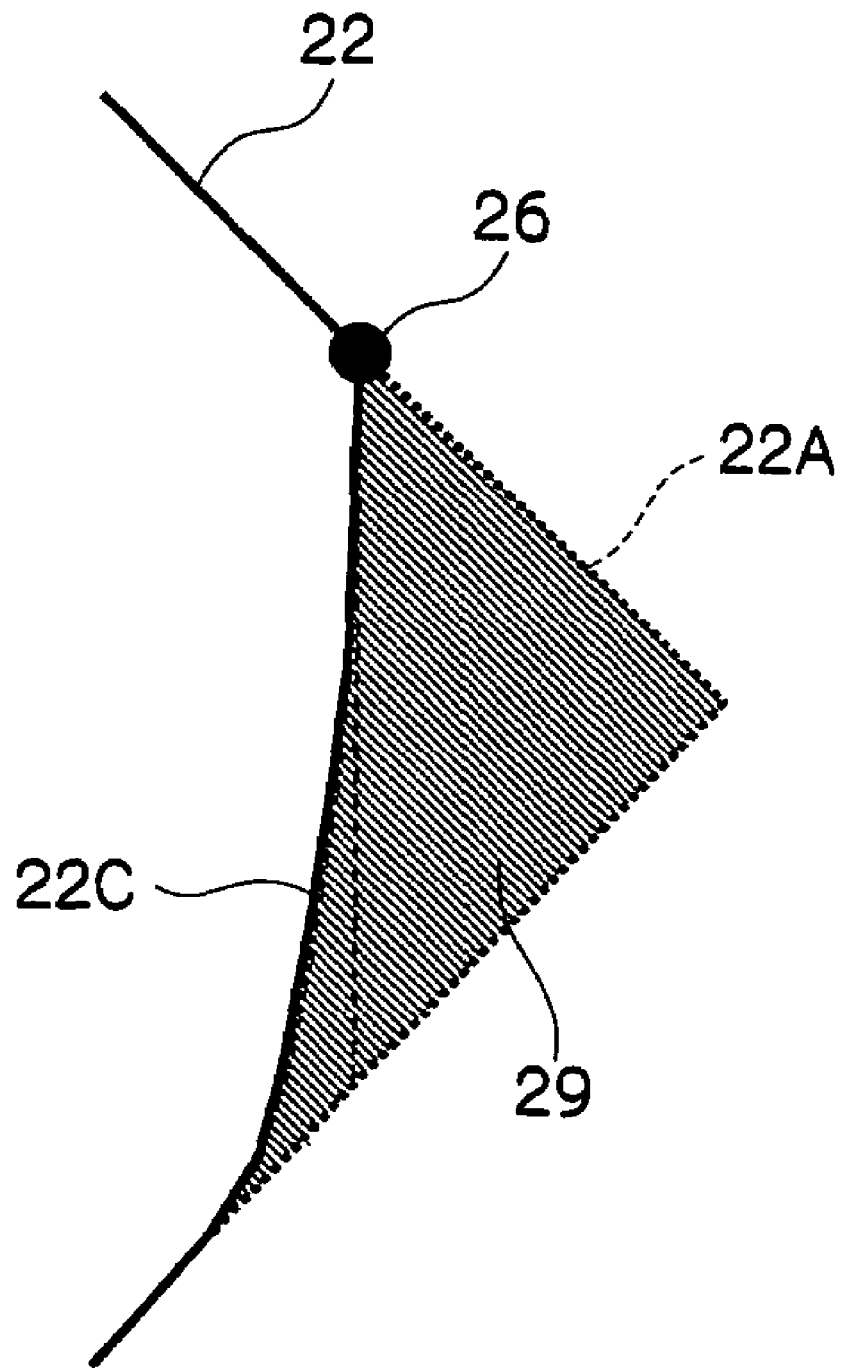
FIG. 6 is a conceptual diagram for describing correction of the outer border.

Further, rather than rewriting the outer border surface lookup table such that the corrected outer border line is a straight line as shown in FIG. 5B, it is also possible to rewrite the outer border surface lookup table such that, as shown in FIG. 6, the corrected outer border line is an outer border line 22C at which the saturation gradually decreases as brightness decreases from the mapping point 26.

Next, an elimination region in the hue angle direction and elimination method will be described for the case in which maintenance of saturation magnitude relations in the cusp brightness hue angle direction is required.

Figure 7B:
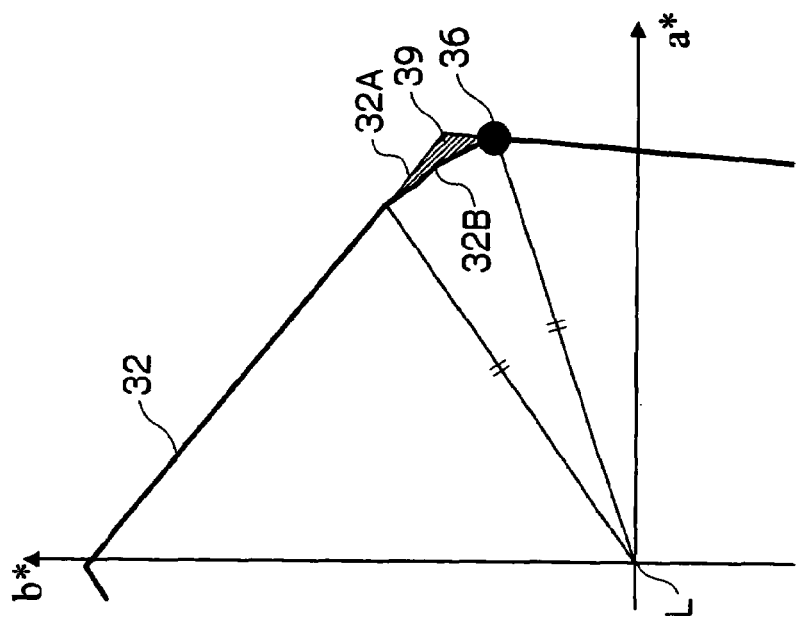
FIG. 7B is a conceptual diagram for describing correction of the outer border.
Figure 7A:
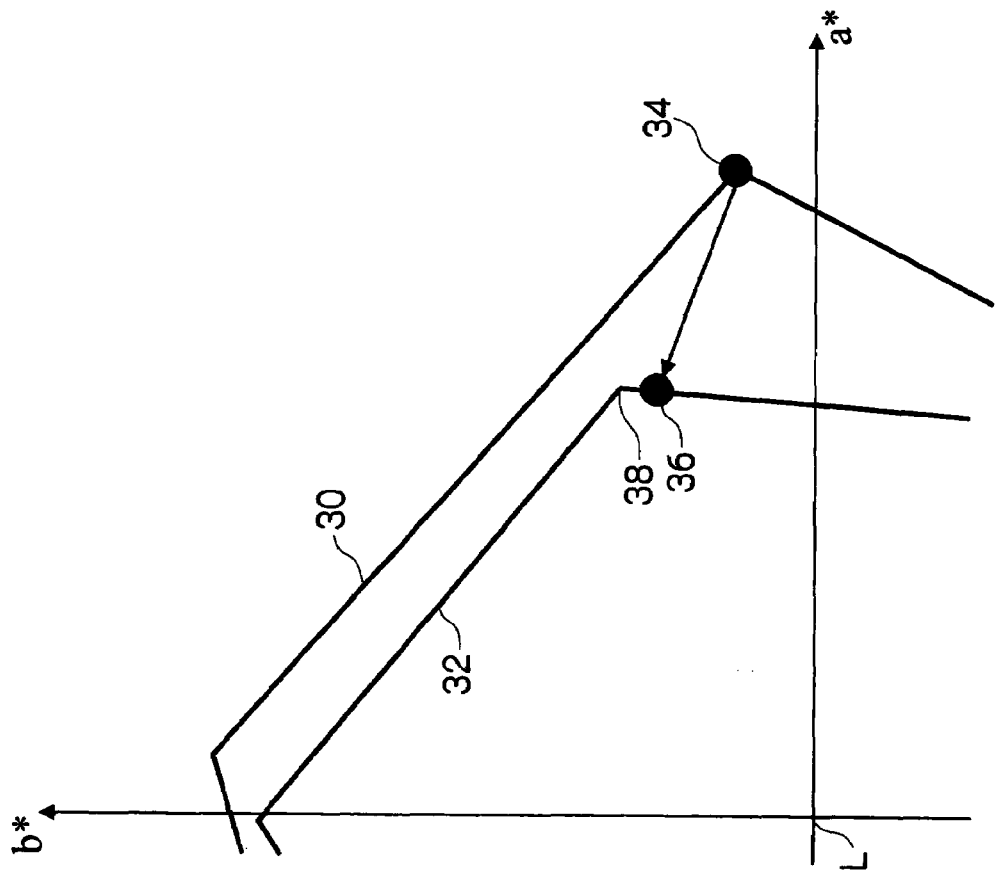
FIG. 7A is a conceptual diagram for describing correction of the outer border.

As shown in FIG. 7A, in a case in which an outer border line 30 of the color reproduction region of the source device in an a*-b* plane at a predetermined hue is at the outer side relative to an outer border line 32 of the color reproduction region of the destination device, the mapping destination of a characteristic point (cusp) 34 on the outer border line 30 of the color reproduction region of the source device is, as shown in FIG. 7A, a mapping point 36 on the outer border line 32 of the color reproduction region of the destination device. In this case, because the mapping point 36 has a lower saturation than a cusp 38 of the color reproduction region of the destination device, saturations according to input image signals may become inverted between before and after the mapping. Therefore, as shown in FIG. 7B, a region 39 that includes saturations higher than the mapping point 36 in the color reproduction region of the destination device (i.e., the hatched area) is eliminated from the color reproduction region of the destination device. This is carried out for each of the characteristic points. Hence, inversions of saturations in the mapping can be prevented.

That is, the outer border surface lookup table is referred to, and the saturations of outer border configuration points with higher saturations than the saturation of the mapping point 36, which are located in the region 39 of FIG. 7B, are rewritten with the saturation of the mapping point 36. With the technique as described above relating to elimination in the brightness direction, saturations higher than the saturation of the mapping point 36 are updated. Accordingly, as shown in FIG. 7B, an outer border line 32A at high saturation side of the original color reproduction region of the destination device becomes an outer border line 32B, and the region 39 with saturations higher than the mapping point 36 is removed. As shown in FIG. 7B, the outer border line 32B is a line joining outer border configuration points at substantially the same distance from the L axis, that is, outer border configuration points having substantially the same saturation.

Thus, it is possible to correct the color reproduction region of the destination device with ease by rewriting the outer border surface lookup table.

Figure 8:
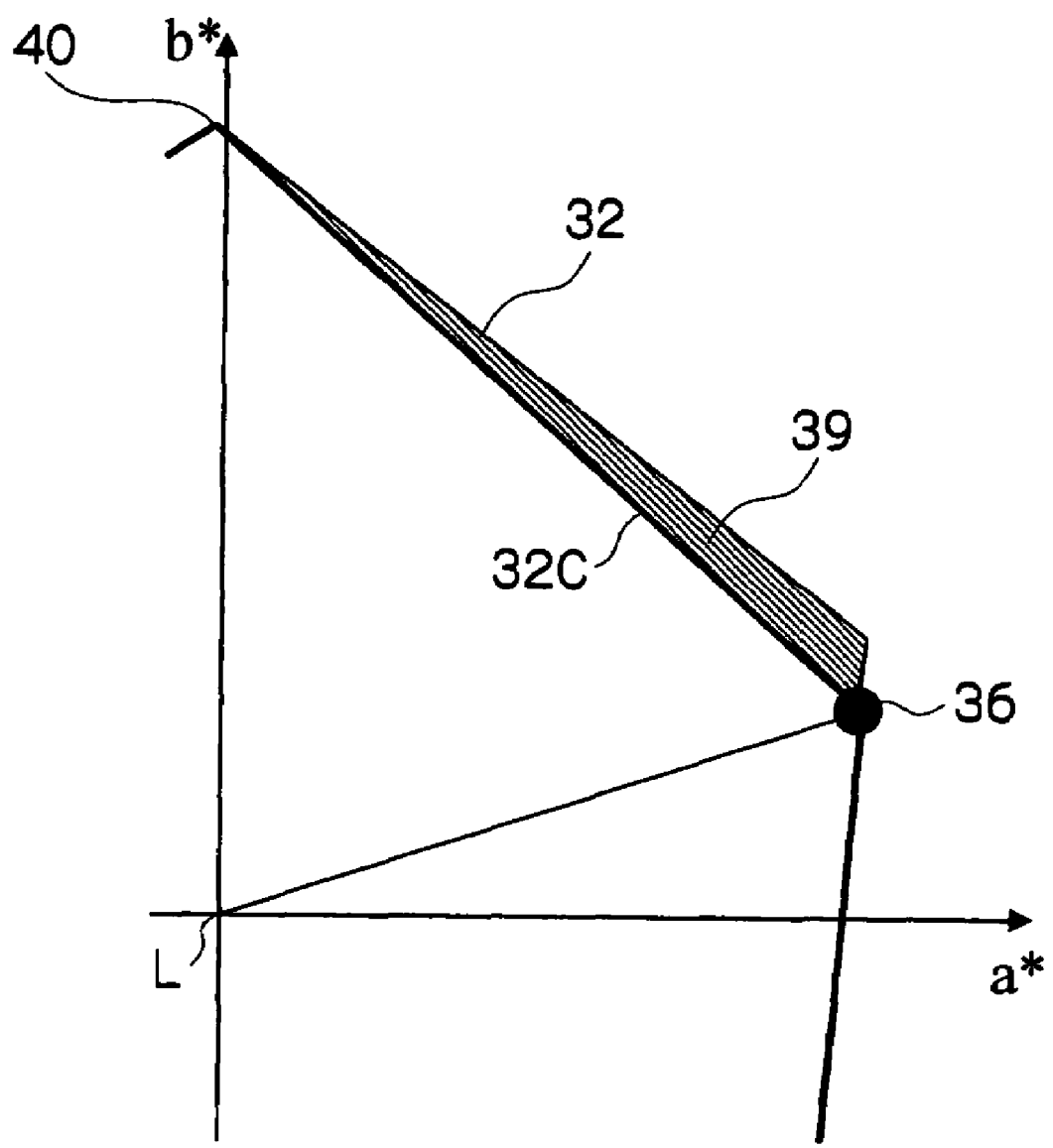
FIG. 8 is a conceptual diagram for describing correction of the outer border.

Rather than rewriting the outer border surface lookup table such that the corrected outer border line is a line joining outer border configuration points with substantially the same saturation as shown in FIG. 7B, it is also possible to rewrite the outer border surface lookup table such that, as shown in FIG. 8, the corrected outer border line is an outer border line 32C which is a straight line linking the mapping point 36 with a cusp 40 that is adjacent to the mapping point 36.

Next, a case in which maintenance of saturation magnitude relations in the ridge line hue angle directions is required will be described with reference to FIGS. 9A and 9B. Note that the lines shown as dotted lines in FIG. 9A represent ridge lines (lines representing halftones) from the white point or black point of the color reproduction region of the source device or destination device to the cusp of each principal color.

Figure 9B:
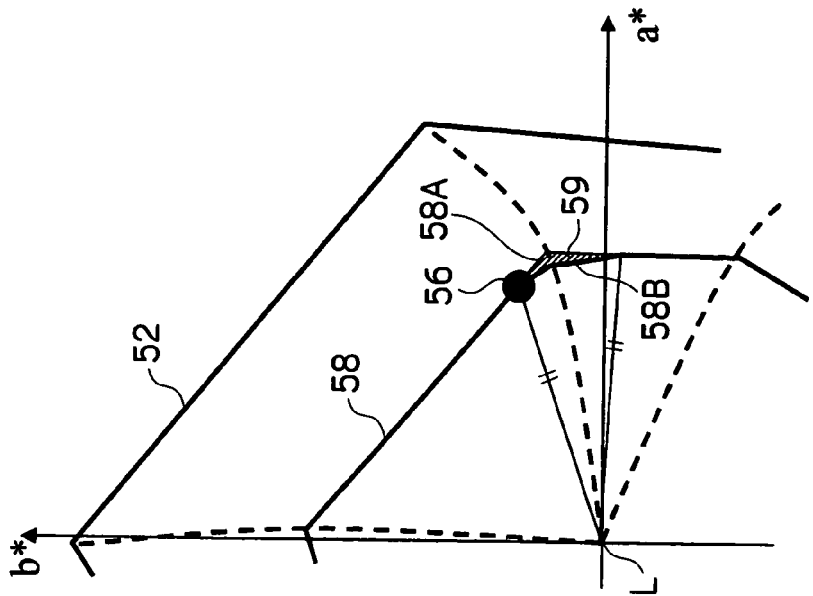
FIG. 9B is a conceptual diagram for describing correction of the outer border.
Figure 9A:
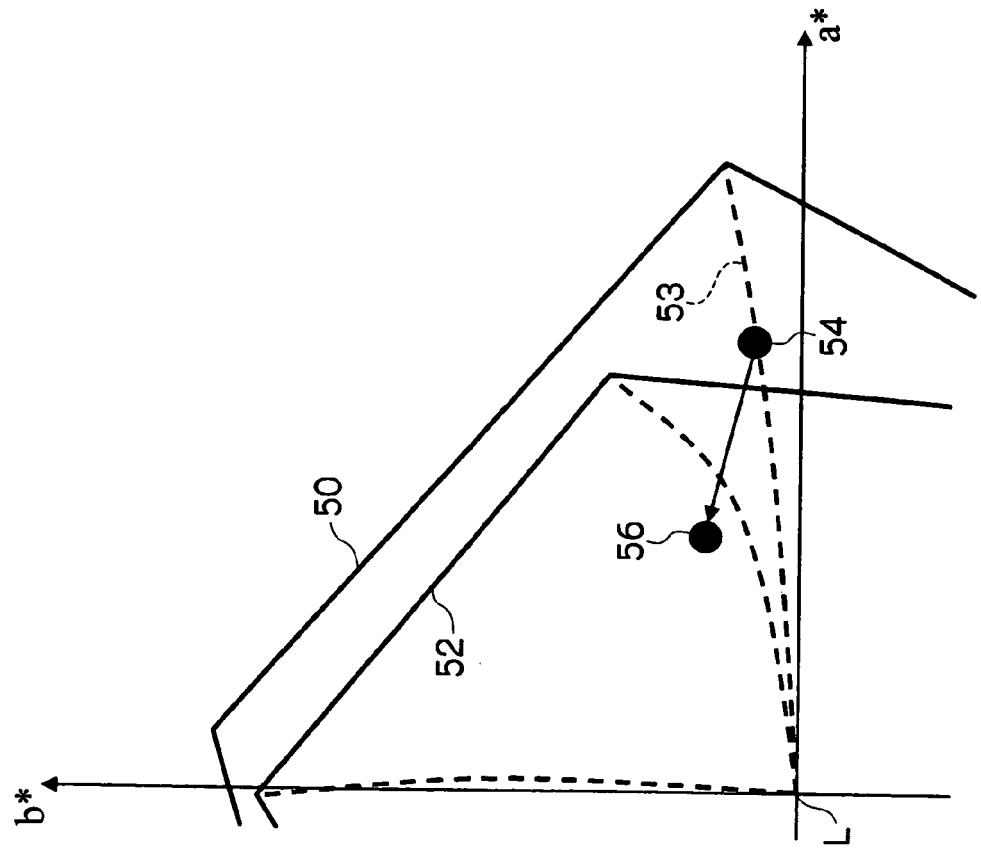
FIG. 9A is a conceptual diagram for describing correction of the outer border.

As shown in FIG. 9A, in a case in which an outer border line 50 of the color reproduction region of the source device in an a*-b* plane at a predetermined hue is at the outer side relative to an outer border line 52 of the color reproduction region of the destination device, the mapping destination of a characteristic point 54, which is taken as an example from plural characteristic points specified on a ridge line 53 of a predetermined color, in the color reproduction region of the destination device is a mapping point 56. In this case, as shown in FIG. 9B, in the color reproduction region of the destination device, an outer border line 58 of the color reproduction region of the destination device at which brightnesses are the same as the mapping point 56 is corrected to eliminate a region 59 (i.e., the hatched area) that includes saturations higher than the mapping point 56 from the color reproduction region of the destination device. This is carried out for each of the characteristic points. Hence, inversions of saturations between before and after mapping can be prevented.

That is, the outer border surface lookup table is referred to, and the saturations of outer border configuration points with higher saturations than the saturation of the mapping point 56, which are in the region 59 of FIG. 9B, are rewritten with the saturation of the mapping point 56. Furthermore, the elimination region can be determined between characteristic points that are on the same ridge line by linear interpolation or the like. Thus, as shown in FIG. 9B, an outer border line 58A at high saturation side of the color reproduction region of the destination device, with brightnesses the same as the mapping point 56, becomes an outer border line 58B, and the region 59 with saturations higher than the mapping point 56 is removed. As shown in FIG. 9B, the outer border line 58B is a line joining outer border configuration points at substantially the same distance from the L axis, that is, having substantially the same saturation.

Thus, it is possible to correct the color reproduction region of the destination device with ease by rewriting the outer border surface lookup table.

Figure 10B:
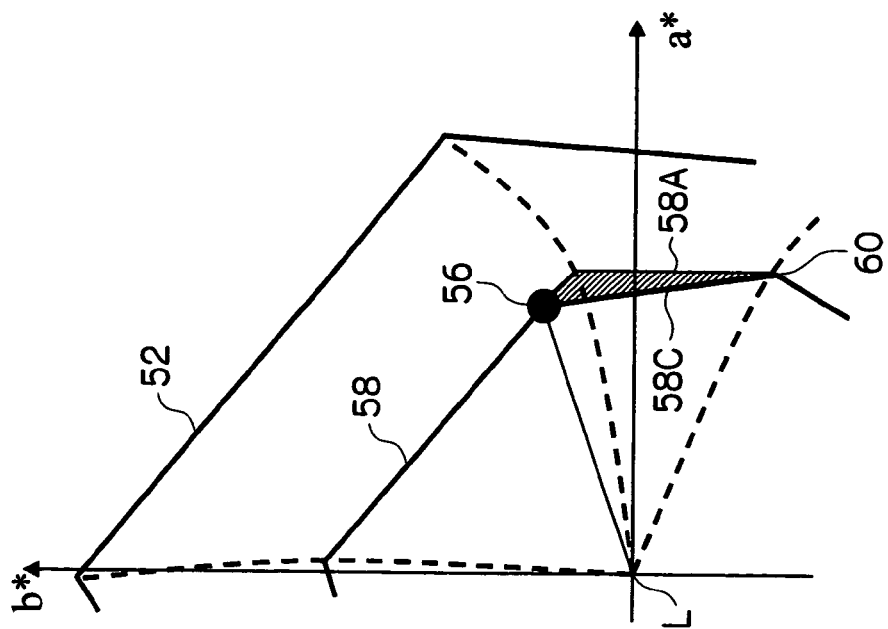
FIG. 10B is a conceptual diagram for describing correction of the outer border.
Figure 10A:
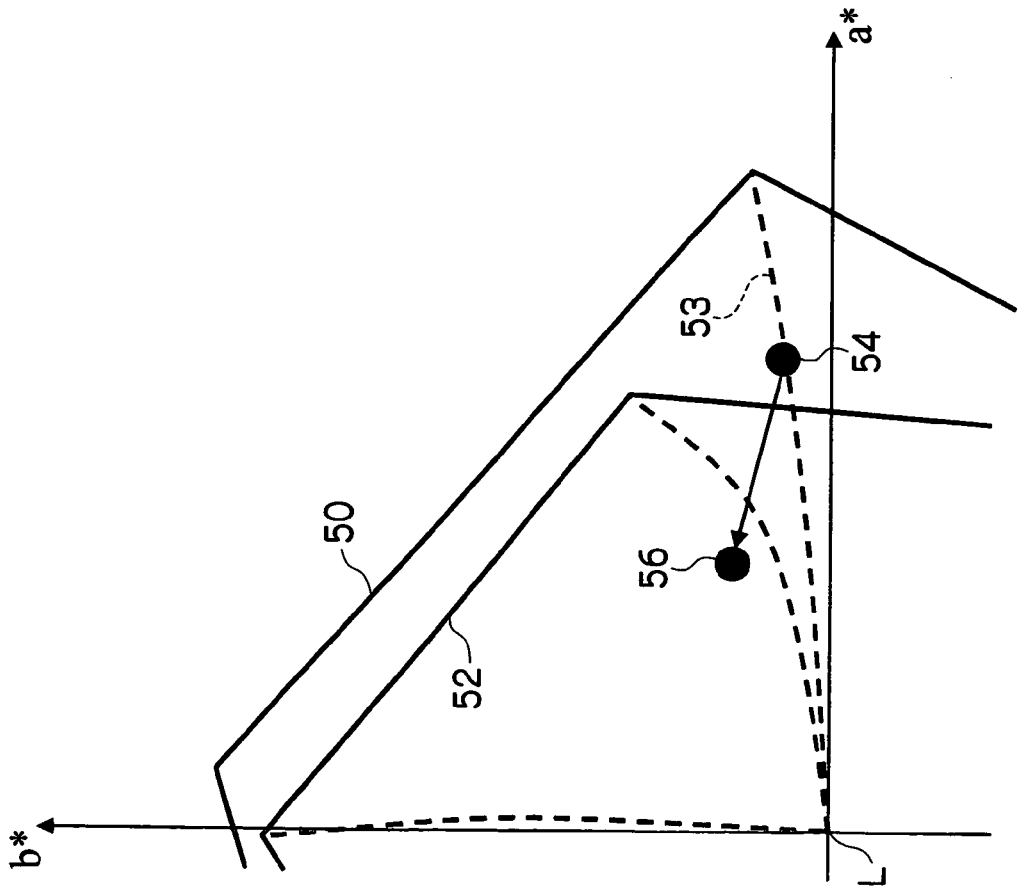
FIG. 10A is a conceptual diagram for describing correction of the outer border.

Rather than rewriting the outer border surface lookup table such that the corrected outer border line is a line joining outer border configuration points with substantially the same saturation as shown in FIG. 9B, it is also possible to rewrite the outer border surface lookup table such that, as shown in FIGS. 10A and 10B, the corrected outer border line is an outer border line 58C which is a straight line linking the mapping point 56 with a cusp 60 that is adjacent to the mapping point 56.

Then, in step 108, in accordance with the color conversion method and mapping parameters set in step 102, input image signals are converted to output image signals in the corrected color reproduction region of the destination device.

Thus, in the present exemplary embodiment, mapping is performed after correcting by cutting down the color reproduction region of the destination device in accordance with mapping destinations of the characteristic points. Therefore, magnitude relations of saturations can be prevented from inverting in the mapping. Furthermore, because the color reproduction region of the destination device is corrected in accordance with request levels relating to maintenance of saturation magnitude relations, a suitable color conversion can be carried out in accordance with user intentions.

Herein, in the present exemplary embodiment, as a method for correcting the outer border of the color reproduction region of the destination device, a method of rewriting an outer border surface lookup table has been described. However, this is not a limitation; it is also possible to generate a new color reproduction region with a corrected outer border.

For example, polygon data representing a solid outer border which is closed by outer border lines which are newly specified at the time of cutting down the color reproduction region of the destination device (for example, the outer border line 22B of FIGS. 5A and 5B, the outer border line 32B of FIGS. 7A and 7B, and the like) is prepared. On the basis of this polygon data and outer border data representing an outer border of the color reproduction region of the destination device, an AND region which is in both this solid and the color reproduction region of the destination device is found. An outer border of the AND region that is found serves as a corrected outer border of the color reproduction region of the destination device. Thus, a color reproduction region of which the outer border is cut down is newly prepared, and a precisely corrected color reproduction region is provided.

The foregoing descriptions of the exemplary embodiments of the present invention have been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color conversion device for color-converting an input image signal in an input color reproduction region of a source device, in a predetermined color space, by mapping the input image signal into an output color reproduction region of a destination device, in the predetermined color space, the device comprising:

a calculation portion for calculating a mapping destination in the output color reproduction region of a pre-specified characteristic point in the input color reproduction region;

a correction portion for correcting the output color reproduction region such that a region including a saturation higher than the calculated mapping destination is eliminated; and a mapping portion for mapping the input image signal into the corrected output color reproduction region.

2. The color conversion device of claim 1, further comprising a setting portion setting a color gamut mapping method and a color gamut mapping parameter in accordance with a color reproduction objective selected from a plurality of color reproduction objectives, the calculation portion calculating the mapping destination in accordance with the color gamut mapping method and color gamut mapping parameter that are set by the setting portion.

3. The color conversion device of claim 2, wherein the characteristic point includes at least one of a point of maximum saturation in the predetermined color space, with a maximum saturation of a predetermined color, and a point on a ridge line in the predetermined color space, corresponding to a gradation from a white point or a black point up to a point of maximum saturation of a predetermined color.

4. The color conversion device of claim 1, wherein the characteristic point includes at least one of a point of maximum saturation in the predetermined color space, with a maximum saturation of a predetermined color, and a point on a ridge line in the predetermined color space, corresponding to a gradation from a white point or a black point up to a point of maximum saturation of a predetermined color.

5. The color conversion device of claim 1, further comprising an acquisition portion for acquiring a request level relating to maintenance of saturation magnitude relations between before and after the mapping, the correction portion correcting the output color reproduction region in accordance with the request level.

6. The color conversion device of claim 5, wherein the request level determines at least one of whether or not it is necessary to maintain magnitude relations of saturations of colors in a vicinity of a point of maximum saturation in the predetermined color space, with a maximum saturation of a predetermined color, between before and after mapping, and whether or not it is necessary to maintain magnitude relations of saturations of colors in a vicinity of a ridge line in the predetermined color space, corresponding to a gradation from a white point or a black point up to a point of maximum saturation of a predetermined color, between before and after mapping.

7. The color conversion device of claim 1, wherein the correction portion corrects the output color reproduction region by rewriting, of outer border data representing an outer border of the output color reproduction region, data of a saturation of a portion that corresponds to the region including a saturation higher than the calculated mapping destination.

8. The color conversion device of claim 1, wherein the correction portion corrects the output color reproduction region by newly generating outer border data representing an outer border of the output color reproduction region, with the region including a saturation higher than the calculated mapping destination being eliminated from the output color reproduction region.

9. A color conversion method for color-converting an input image signal in an input color reproduction region of a source device, in a predetermined color space, by mapping the input image signal into an output color reproduction region of a destination device, in the predetermined color space, the method comprising the steps of:

calculating a mapping destination in the output color reproduction region of a pre-specified characteristic point in the input color reproduction region;

correcting the output color reproduction region such that a region that is adjacent to the calculated mapping destination and includes a saturation higher than that of a color of the mapping destination is eliminated; and mapping the input image signal into the corrected output color reproduction region, wherein at least one of the steps is executed using a processor.

10. The color conversion method of claim 9, wherein a color gamut mapping method and a color gamut mapping parameter are set in accordance with a color reproduction objective selected from a plurality of color reproduction objectives, and the mapping destination is calculated in accordance with the color gamut mapping method and color gamut mapping parameter that have been set.

11. The color conversion method of claim 10, wherein a request level relating to maintenance of saturation magnitude relations between before and after the mapping is acquired, and the output color reproduction region is corrected in accordance with the request level.

12. The color conversion method of claim 9, wherein a request level relating to maintenance of saturation magnitude relations between before and after the mapping is acquired, and the output color reproduction region is corrected in accordance with the request level.

13. A computer readable storage medium storing a color conversion program for causing a computer to perform processing for color-converting an input image signal in an input color reproduction region of a source device, in a predetermined color space, by mapping the input image signal into an output color reproduction region of a destination device, in the predetermined color space, the processing comprising the steps of:

calculating a mapping destination in the output color reproduction region of a pre-specified characteristic point in the input color reproduction region;

correcting the output color reproduction region such that a region that is adjacent to the calculated mapping destination and includes a saturation higher than that of a color of the mapping destination is eliminated; and mapping the input image signal into the corrected output color reproduction region.

14. The color conversion program of claim 13, further comprising the processing of setting a color gamut mapping method and a color gamut mapping parameter in accordance with a color reproduction objective selected from a plurality of color reproduction objectives.

15. The color conversion program of claim 14, further comprising the processing of acquiring a request level relating to maintenance of saturation magnitude relations between before and after the mapping.

16. The color conversion program of claim 13, further comprising the processing of acquiring a request level relating to maintenance of saturation magnitude relations between before and after the mapping.

* * * * *